(12) United States Patent
Usui et al.

(10) Patent No.: US 9,374,163 B2
(45) Date of Patent: Jun. 21, 2016

(54) OPTICAL WAVEGUIDE SUBSTRATE AND INFORMATION PROCESSING DEVICE

(71) Applicant: FUJITSU LIMITED, Kawasaki-shi, Kanagawa (JP)

(72) Inventors: Daisuke Usui, Kawasaki (JP); Kohei Choraku, Yokohama (JP); Masahiro Iwama, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/472,459

(22) Filed: Aug. 29, 2014

(65) Prior Publication Data

US 2015/0063746 A1    Mar. 5, 2015

(30) Foreign Application Priority Data

Sep. 2, 2013  (JP) .................................. 2013-181621

(51) Int. Cl.
  *H04B 10/25* (2013.01)
  *G02B 6/42* (2006.01)
  *G02B 6/43* (2006.01)

(52) U.S. Cl.
  CPC ............ *H04B 10/2504* (2013.01); *G02B 6/421* (2013.01); *G02B 6/4214* (2013.01); *G02B 6/43* (2013.01)

(58) Field of Classification Search
  CPC ............ G02B 6/12; G02B 6/24; G02B 6/421; G02B 6/4214; G02B 6/43; H04B 10/2504
  USPC .......................................................... 385/14
  See application file for complete search history.

(56) References Cited

U.S. PATENT DOCUMENTS

| 3,611,815 | A | * | 10/1971 | Fischell ............................ 74/5.7 |
| 3,810,258 | A | * | 5/1974 | Mathauser ......... H01R 13/6205 439/246 |
| 4,004,298 | A | * | 1/1977 | Freed ................ A61M 39/0247 285/9.1 |
| 4,622,726 | A | * | 11/1986 | Nakamura ........... A44C 5/2057 24/303 |
| 4,844,582 | A | * | 7/1989 | Giannini ......................... 385/57 |
| 5,261,015 | A | * | 11/1993 | Glasheen ............... G02B 6/356 385/23 |
| 5,359,686 | A | * | 10/1994 | Galloway et al. ............... 385/49 |
| 5,954,520 | A | * | 9/1999 | Schmidt ................... B60D 1/64 439/289 |
| 6,102,582 | A | * | 8/2000 | Espindola .............. G02B 6/266 385/140 |
| 6,896,421 | B2 | * | 5/2005 | Monson et al. ................. 385/89 |
| 7,056,127 | B2 | * | 6/2006 | Suzuki .............. H01R 13/6205 439/22 |
| 7,755,462 | B2 | * | 7/2010 | Fullerton et al. .............. 335/306 |
| 7,817,005 | B2 | * | 10/2010 | Fullerton et al. .............. 335/306 |
| 7,817,006 | B2 | * | 10/2010 | Fullerton et al. .............. 335/306 |
| 8,315,491 | B2 | | 11/2012 | Hino et al. |
| 8,315,492 | B2 | * | 11/2012 | Chen et al. ...................... 385/33 |

(Continued)

FOREIGN PATENT DOCUMENTS

| JP | 55053306 A | * | 4/1980 | ............... G02B 7/26 |
| JP | 1-173712 | | 12/1989 | |

(Continued)

*Primary Examiner* — Peter Radkowski
(74) *Attorney, Agent, or Firm* — Staas & Halsey LLP

(57) ABSTRACT

An optical waveguide substrate includes: a substrate body in which an optical waveguide is formed; a cable holding part configured to have a cable holding hole into which a signal cable is inserted, the signal cable having one of an incidence part and an emission part that is arranged so as to face the optical waveguide and having a first magnetic part; and a second magnetic part configured to generate a repulsive force in the cable holding hole in association with the first magnetic part.

10 Claims, 12 Drawing Sheets

(56) References Cited

U.S. PATENT DOCUMENTS

| | | | |
|---|---|---|---|
| 8,388,353 B2* | 3/2013 | Kiani | H01R 13/7037 439/39 |
| 8,576,034 B2* | 11/2013 | Bilbrey | H01R 13/641 335/285 |
| 8,794,980 B2* | 8/2014 | McCormack | H01R 13/6205 439/39 |
| 8,939,773 B2* | 1/2015 | McCormack | H01R 13/6205 439/39 |
| 2004/0165836 A1* | 8/2004 | Monson et al. | 385/89 |
| 2007/0072443 A1* | 3/2007 | Rohrbach | H01R 13/6205 439/39 |
| 2010/0080563 A1* | 4/2010 | DiFonzo et al. | 398/115 |
| 2010/0233889 A1* | 9/2010 | Kiani | H01R 13/7037 439/39 |
| 2010/0272403 A1* | 10/2010 | Chen et al. | 385/93 |
| 2011/0091181 A1* | 4/2011 | DeMeritt et al. | 385/140 |
| 2012/0028480 A1* | 2/2012 | Bilbrey | H01R 13/6205 439/39 |
| 2012/0170886 A1* | 7/2012 | Yu et al. | 385/14 |
| 2012/0189248 A1* | 7/2012 | Hsu | 385/33 |
| 2013/0157477 A1* | 6/2013 | McCormack | H01R 13/6205 439/39 |
| 2014/0120746 A1* | 5/2014 | Person | G02B 6/3817 439/39 |
| 2014/0342579 A1* | 11/2014 | McCormack | H01R 13/6205 439/39 |
| 2015/0126047 A1* | 5/2015 | McCormack | H01R 13/6205 439/39 |

FOREIGN PATENT DOCUMENTS

| | | | |
|---|---|---|---|
| JP | 5-4110 | 1/1993 | |
| JP | 2002246111 A * | 8/2002 | H01R 13/639 |
| JP | 2002311297 A * | 10/2002 | G02B 6/38 |
| JP | 2007-272047 | 10/2007 | |
| WO | WO 2008/023508 A1 | 2/2008 | |

* cited by examiner

OPTICAL WAVEGUIDE SUBSTRATE AND INFORMATION PROCESSING DEVICE

CROSS-REFERENCE TO RELATED APPLICATION

This application is based upon and claims the benefit of priority of the prior Japanese Patent Application No. 2013-181621 filed on Sep. 2, 2013, the entire contents of which are incorporated herein by reference.

FIELD

A certain aspect of the embodiments is related to an optical waveguide substrate and an information processing device.

BACKGROUND

Conventionally, there is known an interconnect technique using an optical element and an optical waveguide for implementing high speed data transmission in a device such as an information processing device. In the interconnect technique, the quality of data transmission depends on the alignment of the optical axes of the optical element and the optical waveguide in the optical coupling therebetween. As means for reducing loss in the optical coupling, there are known a connector for an optical data link (Japanese Laid-Open Utility Model Publication No. 1-173712) and a structure for interconnecting the optical fiber and the optical waveguide (Japanese Laid-Open Utility Model Publication No. 5-4110). Further, related arts are described in Japanese Laid-Open Patent Publication No. 2007-272047 and International Publication Pamphlet No. WO2008/023508.

SUMMARY

According to an aspect of the present invention, there is provided an optical waveguide substrate including: a substrate body in which an optical waveguide is formed; a cable holding part configured to have a cable holding hole into which a signal cable is inserted, the signal cable having one of an incidence part and an emission part that is arranged so as to face the optical waveguide and having a first magnetic part; and a second magnetic part configured to generate a repulsive force in the cable holding hole in association with the first magnetic part.

Figure 1:
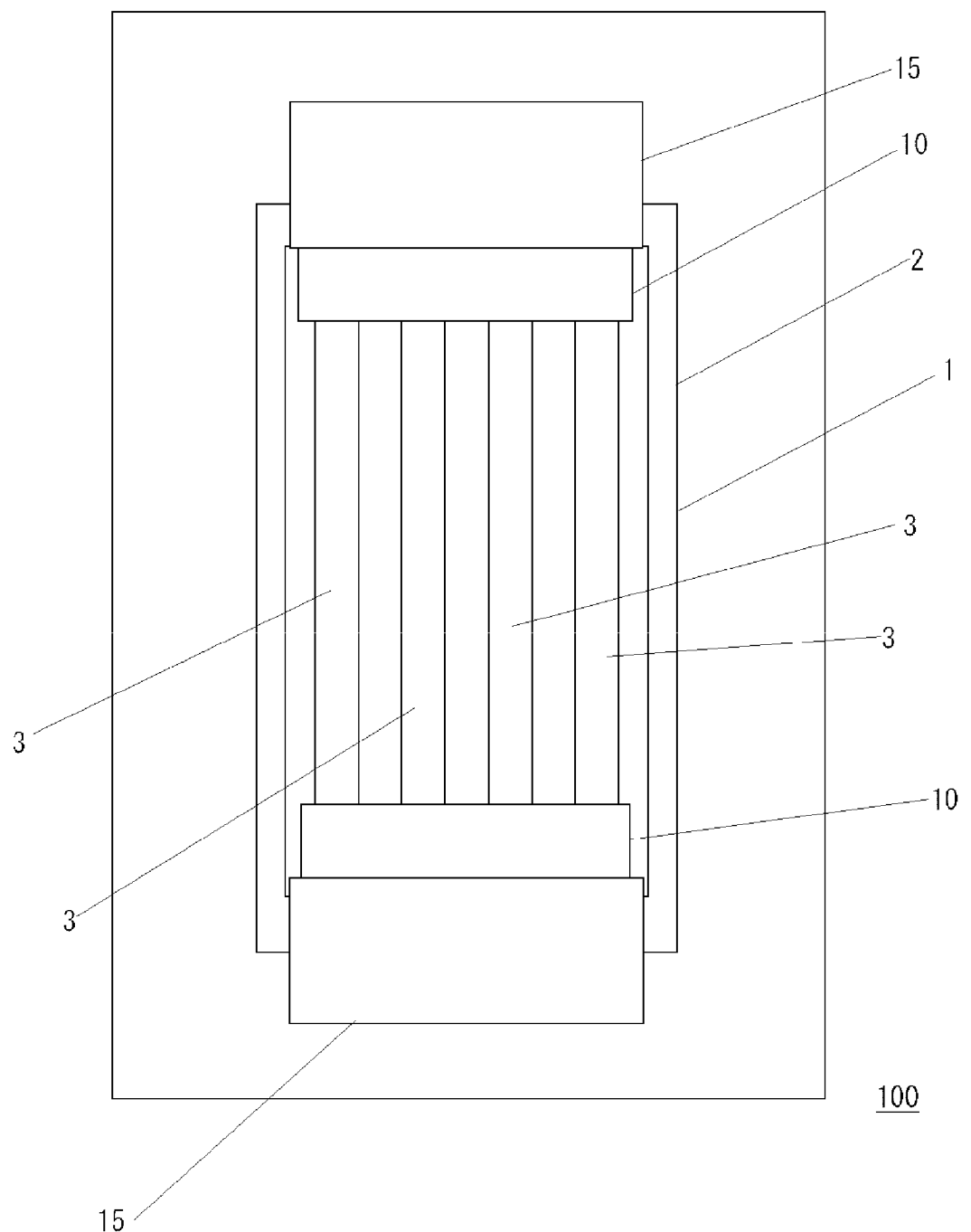
FIG. 1 is a schematic diagram of a structure of an information processing device in accordance with an embodiment.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

According to an aspect of embodiments described below, an optical waveguide and an optical element are aligned with each other so that the optical axes are appropriately arranged in a line.

A description is now given of embodiments in conjunction with the accompanying drawings. In the drawings, the following are to be noted. The dimensions and ratios of parts in the drawings may be different from the actual dimensions and ratios for the sake of convenience. Some of the structural parts that really exist may be omitted from the drawings or may be emphasized for the sake of convenience. Front and rear directions, right and left directions and up and down directions are defined as illustrated in FIG. 2.

Figure 3A:
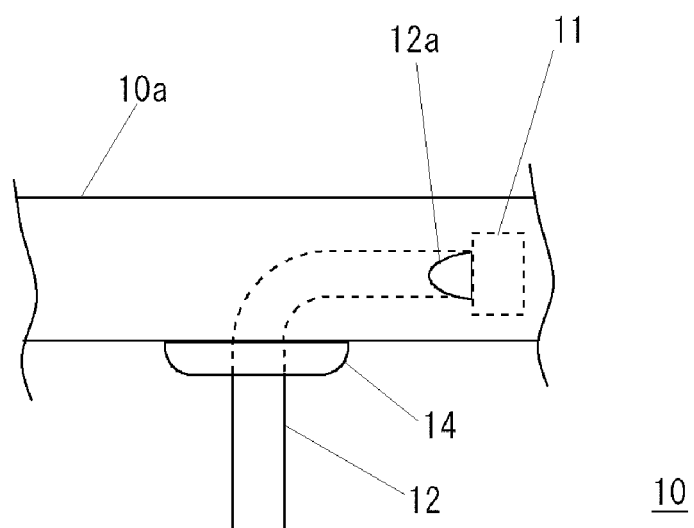
FIG. 3A is a front view of a part of an optical module equipped with an optical element included in the optical waveguide substrate of the embodiment.
Figure 3B:
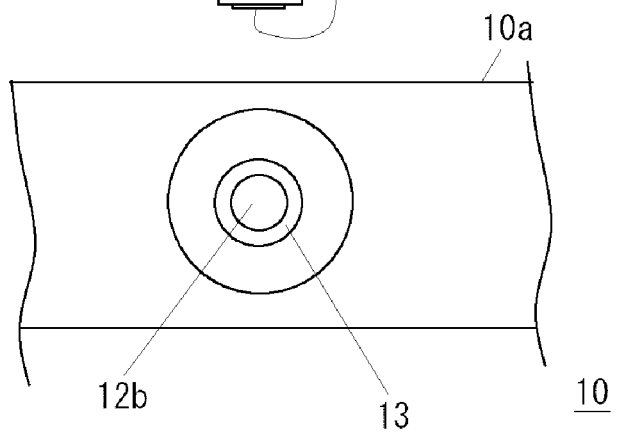
FIG. 3B is a bottom view thereof.
Figure 4A:
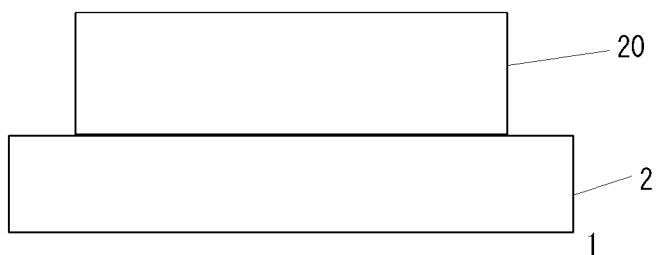
FIG. 4A is a front view of a substrate body of the optical waveguide substrate of the embodiment.
Figure 4B:
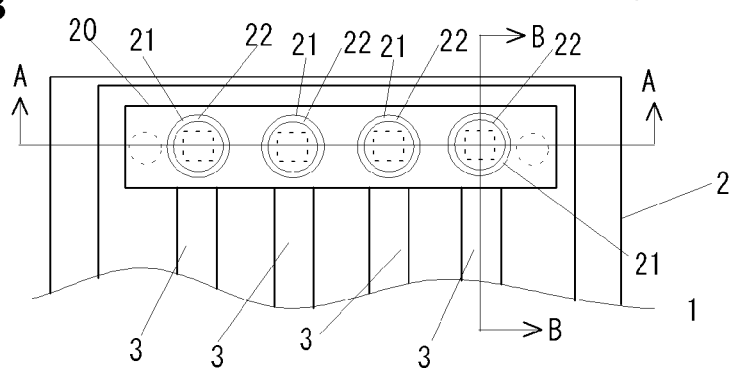
FIG. 4B is a plan view of a part of the substrate body.
Figure 4C:
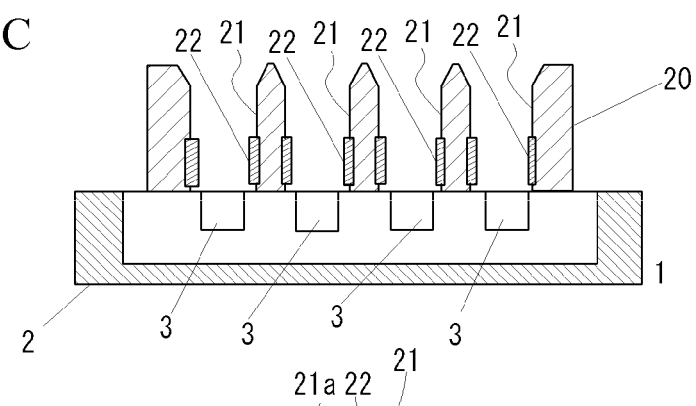
FIG. 4C is a cross-sectional view taken along a line A-A in FIG. 4B.
Figure 4D:
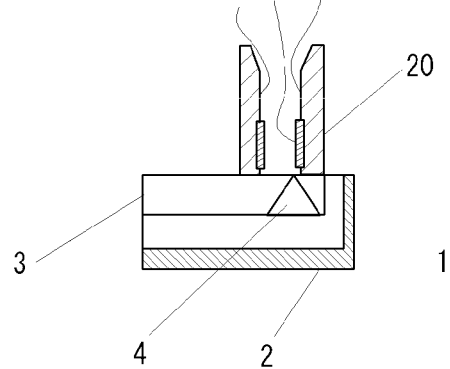
FIG. 4D is a cross-sectional view taken along a line B-B in FIG. 4B.

FIG. 1 is a schematic diagram of a structure of an information processing device 100 in accordance with an embodiment. FIG. 2 is an exploded perspective view of an optical waveguide substrate 1. FIG. 3A is a front view of a part of an optical module 10 equipped with an optical element 11, and FIG. 3B is a bottom view thereof. FIG. 4A is a front view of a substrate body of the optical waveguide substrate 1, and FIG. 4B is a plan view of a part of the substrate body. FIG. 4C is a cross-sectional view taken along a line A-A in FIG. 4B, and FIG. 4D is a cross-sectional view taken along a line B-B in FIG. 4B.

Referring to FIG. 1, the information processing device 100 has the optical waveguide substrate 1 in which data transmission is performed by optical interconnecting. The optical waveguide substrate 1 has the substrate body 2 in which a plurality of optical waveguides 3 extend in the front/rear directions. The optical module 10 is mounted on ends of the optical waveguides 3. An IC (Integrated Circuit) module 15 is connected to the optical module 10. The information processing device 100 thus structured is an exemplary device equipped with the optical waveguide substrate 1, which may be mounted on another device involved in data transmission.

Figure 2:
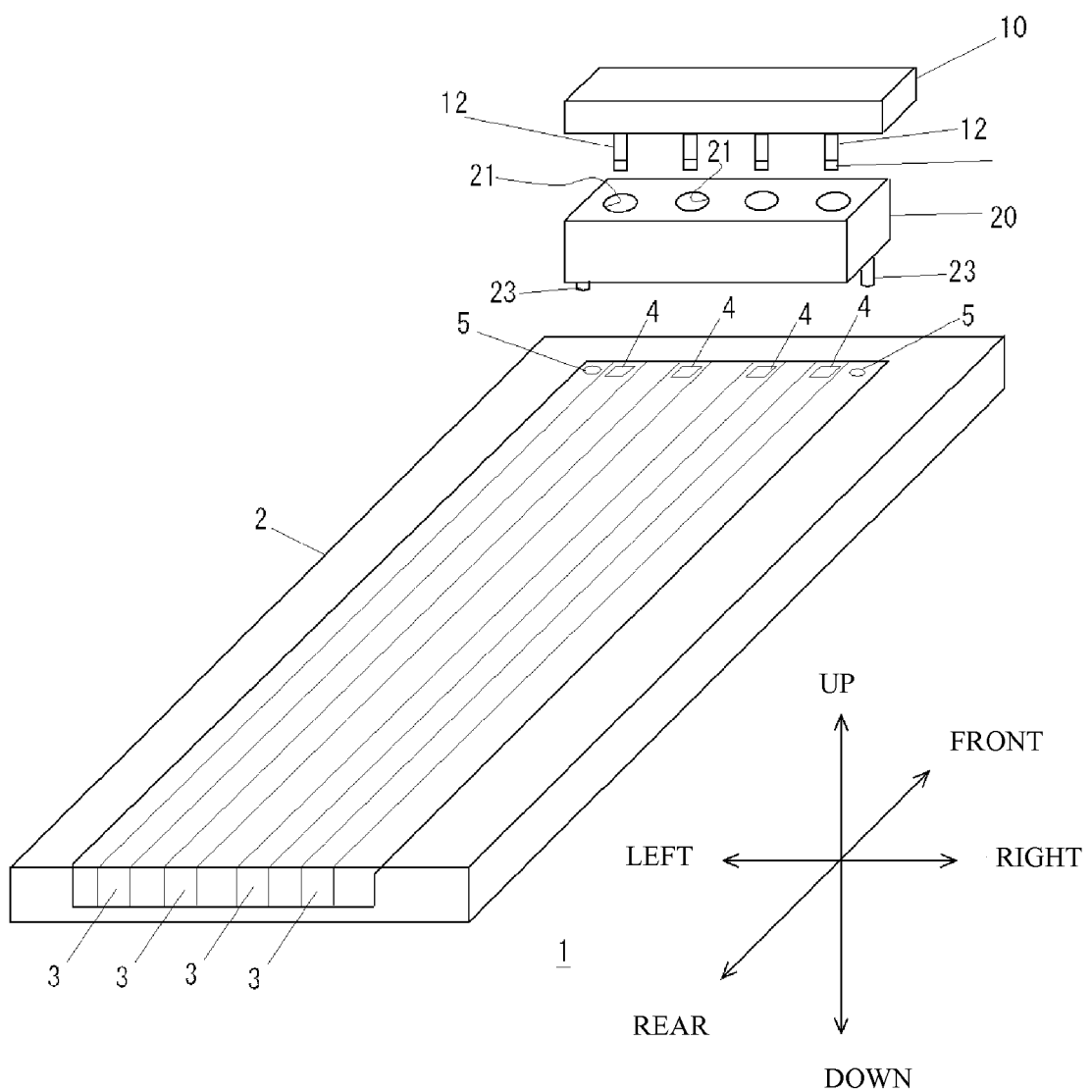
FIG. 2 is an exploded perspective view of an optical waveguide substrate in accordance with the embodiment.

Referring to FIG. 2, the optical waveguide substrate 2 has mirror parts 4 provided in ends of the optical waveguides 3 arranged side by side in the right/left directions. The mirror parts 4 refract lights to change the respective optical paths.

The optical waveguide substrate 2 is equipped with a cable holding part 20 formed to cover the ends of the optical waveguides 3. The cable holding part 20 has cable holding holes 21 respectively associated with the positions of the corresponding mirror parts 4. The cable holding holes 21 are cylindrically shaped, for example. The cable holding part 20 is a block member on which the optical module 10 is mounted.

Referring to FIG. 3, there is illustrated one of the optical elements 11 mounted in a body part 10a of the optical module 10. The optical element 11 is a light-emitting element and has a light-emitting part 12a. In another case where the optical element 11 is a light-receiving element, a light receiving part is provided instead of the light-emitting part 12a. The optical module 10 has an optical fiber 12 that extends from the optical element 11. The optical fiber 12 corresponds to a signal cable over which data is transmitted, and extends to the outside of the main body 10a of the optical module 10. The optical fiber 12 is suspended from the optical module 10. The optical fiber 12 has a flexibility. The signal cable may be a flexible signal cable other than the optical fiber. The optical fiber 12 has an emission part 12b arranged on the opposite side to the side on which the optical element 11 is provided. The emission part 12b faces the corresponding optical waveguide 3 through a spacing. The emission part 12b is replaced with an incidence part when the optical element 11 is the light-receiving element. A first magnetic part 13 is provided around the emission part 12b of the optical fiber 12. The first magnetic part 13 is attached to an end portion of the optical fiber 12. The first magnetic part 13 has a ring shape provided around the outer circumferential part of the optical fiber 12. An inner circumferential surface 13a of the first magnetic part 13 has an S-pole, and an outer circumferential surface 13b thereof has an N-pole. The S-pole and the N-pole may be interchanged with each other in association with a second magnetic part 22, which will be described later. The first magnetic part 13 may be formed by a magnetic member or magnet. The first magnetic part 13 may have a member shaped into a pipe. The first magnetic part 13 of the present embodiment may be formed by attaching a neodymium-based magnetic material to the end of the optical fiber 12 by immersion or application, hardening the material by heating or the like, and magnetizing the hardened material by an external magnetic field.

Figure 5:
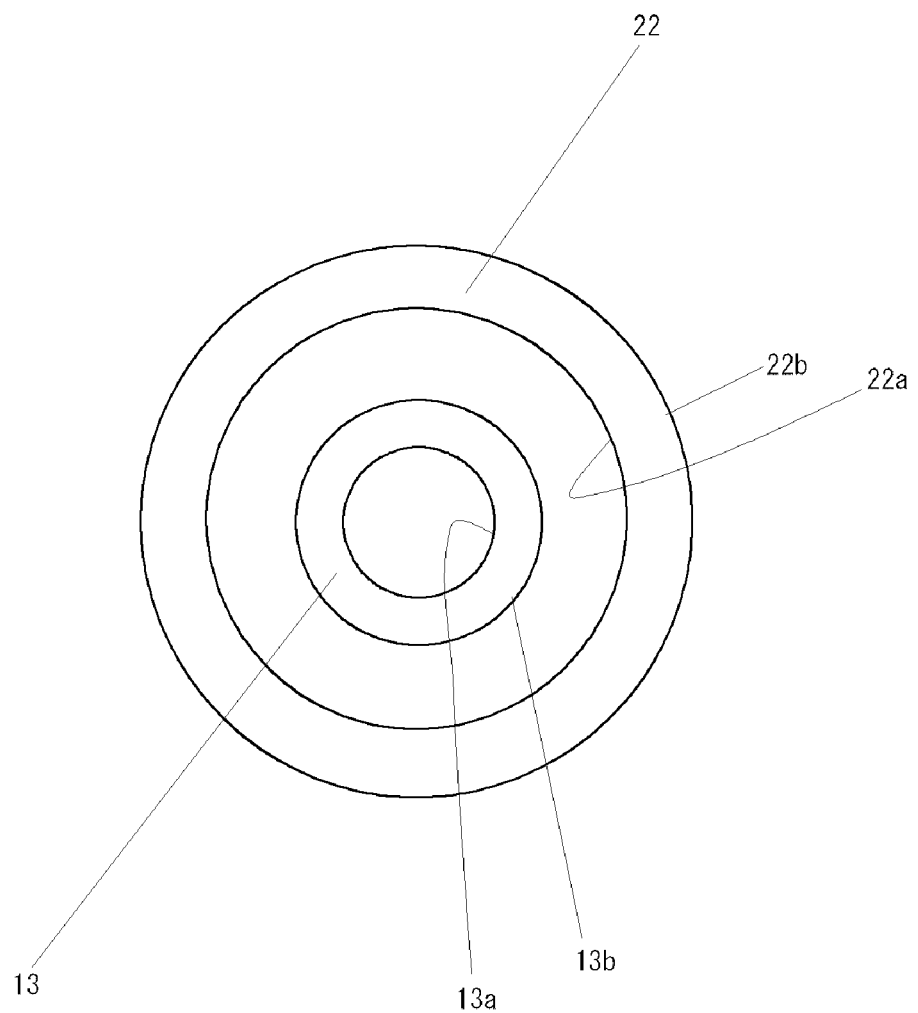
FIG. 5 is a diagram that illustrates a relationship between a first magnetic part and a second magnetic part.

Referring to FIGS. 4A through 4D, the cable holding part 20 has second magnetic parts 22 provided around inner circumferential walls 21a of the cable holding holes 21 provided so as to correspond to the positions of the mirror parts 4. The second magnetic parts may be made of a magnetic substance or a magnet. The second magnetic parts 22 generate repulsive forces in association with the first magnetic parts 13. As described previously, each of the first magnetic parts 13 is arranged so that the inner circumferential surface 13a has the S-pole and the outer circumferential surface 13b has the N-pole. Referring to FIG. 5, the second magnetic part 22 has an N-pole on an inner circumferential surface 22a that faces the outer circumferential surface 13b and the first magnetic part 13, and an S-pole on an outer circumferential part 22b. Thus, repulsive force is generated between the first magnetic part 13 and the second magnetic part 22. If the S-pole and the N-pole of the first magnetic part 13 are interchanged with each other, the S-pole and the N-pole of the second magnetic part 22 are correspondingly interchanged with each other. That is, the same poles are arranged on the facing surfaces of the first and second magnetic parts 13 and 22.

The cable holding part 20 is positioned so that a center axis AX0 of the cable holding hole 21 is aligned with the center of the corresponding mirror part 4 when the cable holding part 20 is bonded to the substrate body 2. The cable holding part 20 has positioning pins 23 protruding from the bottom surface. The positioning pins 23 are inserted into positioning holes 5 formed in the substrate body 2, whereby the cable holding part 20 is positioned on the substrate body 2. The positioning pins 23 join the cable holding part 20 and the substrate body 2 securely together. Further, UV curable resin is additionally used for bonding. Another appropriate bonding method and adhesive may be used.

Figure 6A:
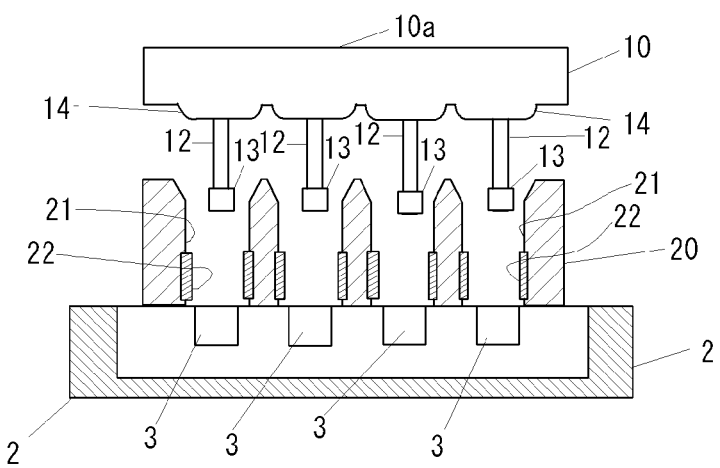
FIG. 6A is an exploded view of the optical module and the substrate body in the embodiment.
Figure 6B:
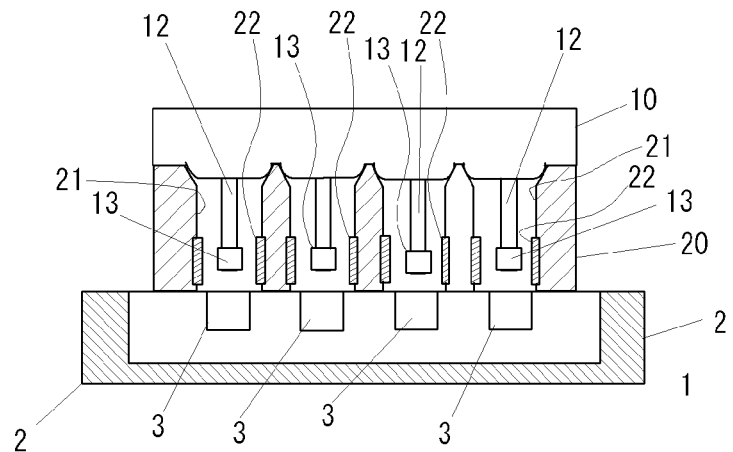
FIG. 6B is a view of the optical module and the substrate in an assembled state.
Figure 7:
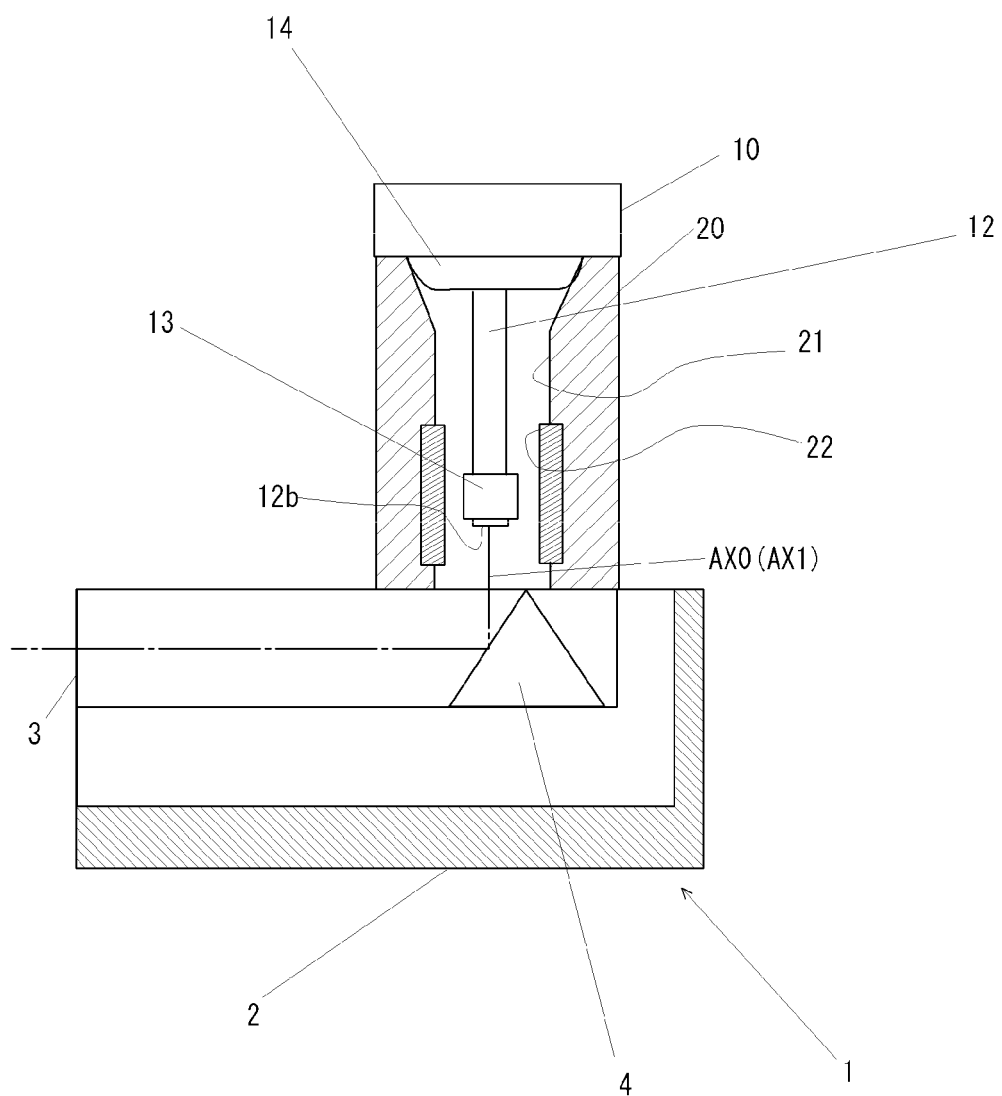
FIG. 7 is an enlarged cross-sectional view of a mirror part and its periphery of the optical waveguide substrate of the embodiment.

Referring to FIGS. 6A and 6B, the optical module 10 is mounted on the cable holding part 20 so that the optical fibers 12 are inserted into the cable holding holes 21. Engagement parts 14 are formed in the optical module 10, and engage with tapered parts formed in upper ends of the cable holding holes 21. In the engagement, it is preferable that the center axes AX1 of the optical fibers 12 are aligned with the center axes AX0 of the cable holding holes 21 as illustrated in FIG. 7. The cable holding holes 21 have a size that allows the first magnetic parts 13 to be moved due to the repulsive force and be settled in a position where repulsive forces between the first and second magnetic parts 13 and 22 are balanced.

Figure 8A:
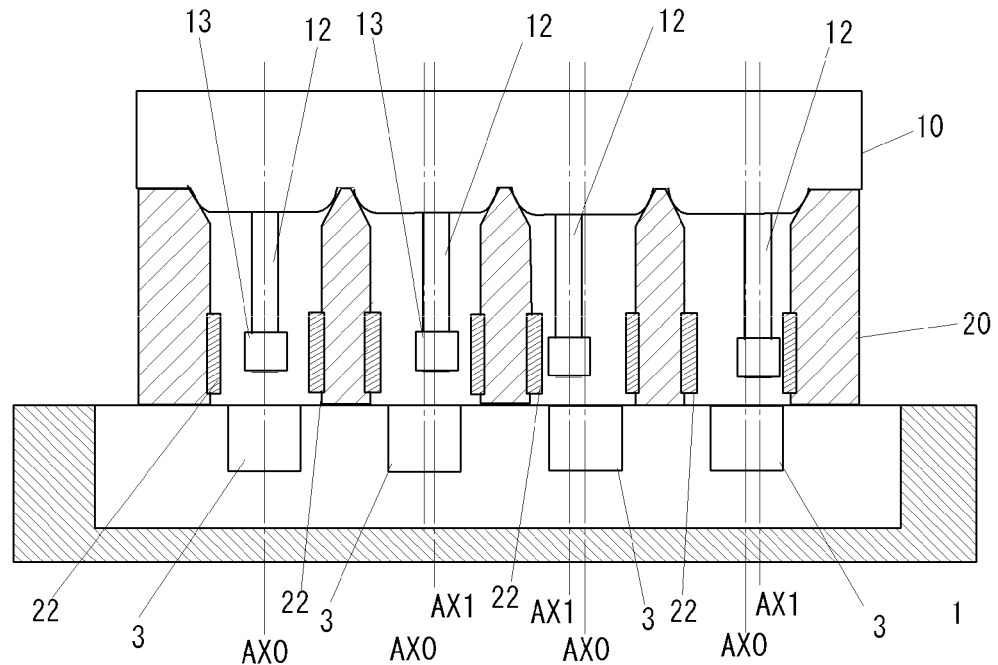
FIG. 8A illustrates a state in which the optical axis of the optical waveguide substrate is misaligned.
Figure 8B:
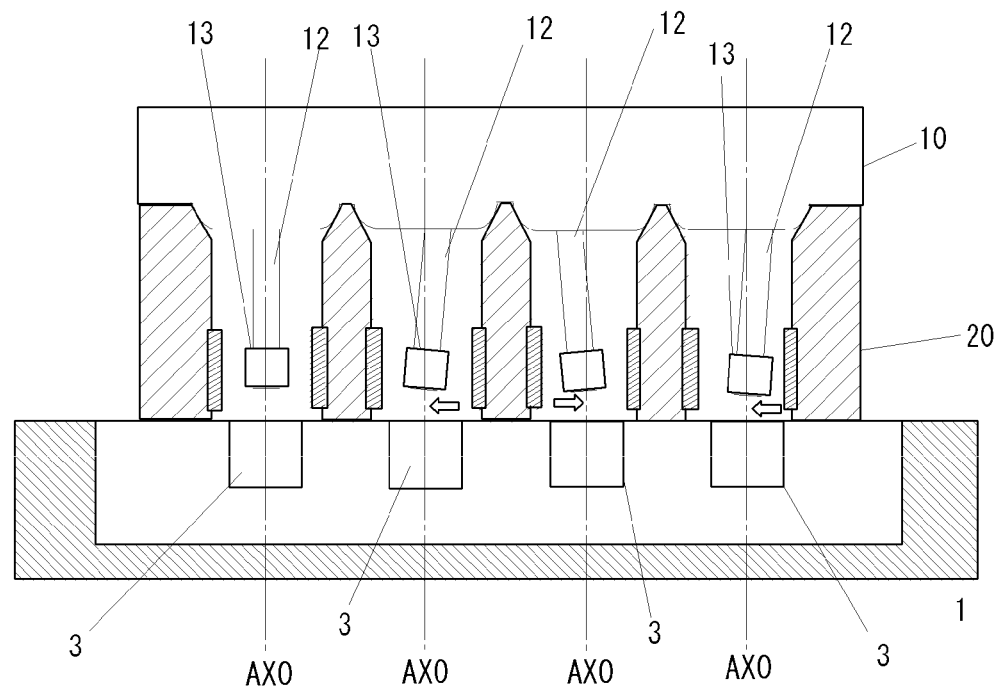
FIG. 8B illustrates a process of alignment in which the optical axis of the optical waveguide substrate is self-aligned

However, as illustrated in FIG. 8A, there is a possibility that the center axes AX1 of the optical fibers 12 are not aligned with the center axes AX0 of the cable holding holes 21. Even in such a misalignment, the optical waveguide substrate 1 is capable of performing self-alignment of the optical axes of the optical fibers 12 by the magnetic forces of the first magnetic part 13 and the second magnetic part 22, in other words, repulsive forces generated therebetween, as illustrated in FIG. 8B. The emission parts 12b formed in the ends of the optical fibers 12 are induced so as to be aligned with the center axes AX0 of the cable holding holes 21 by the magnetic forces. The above self-alignment is now described in detail by referring to an approximation model.

Figure 9:
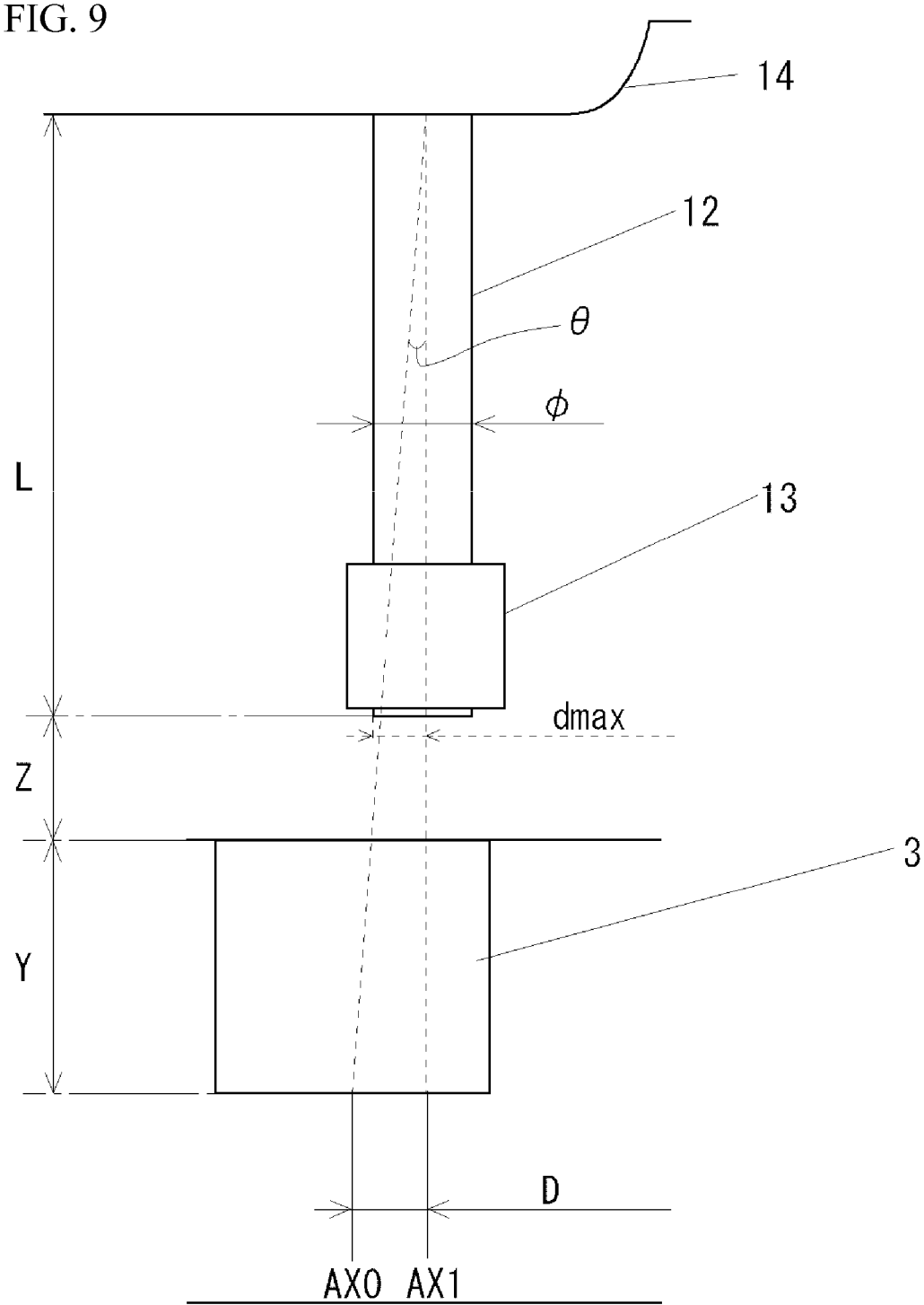
FIG. 9 illustrates a state in which a center axis AX0 of a cable holding hole deviates from a center axis AX1 of an optical fiber by a distance D.

FIG. 9 is a diagram that illustrates a misalignment in which the center axis AX1 of the optical fiber deviates from the center axis AX0 of the cable holding hole 21 by a distance D. An approximation model is used to approximately calculate a weight P needed to bend the optical fiber 12 to align the center axis AX1 of the optical fiber with the center axis AX0 of the cable holding hole 21. More specifically, the approximation model calculates the weight P needed to achieve the alignment by moving the emission part 12b towards the center of the cable holding hole 21 by a distance dmax.

The following parameters are assumed. The diameter Φ of the optical fiber 12 is 0.125 mm. The length L of an exposed part of the optical fiber 12 that protrudes from the engagement part 14 is 5 mm. The above length L is the free length of the optical fiber 12. A distance Z from the emission part 12b to the upper surface of the optical waveguide 3 is 0.5 mm. The core size Y of the optical waveguide 3 (length along one side of the optical waveguide) is 0.05 mm, and the Young's modulus E is 3000 N/mm². The distance D between the center axis AX0 and the center axis AX1 on the lower surface of the optical waveguide 3 is 0.02 mm. Under the above conditions, the necessary weight P is calculated as P=1.55×10⁻⁵ N=1.58 mgf by using the following expression.

$$P = \frac{3\pi}{64L^2} \times \frac{D}{L+Y+Z} \times E\Phi^4 \quad (1)$$

When the alignment is adjusted to achieve the distance D of 0.02 mm between the center axis AX0 and the center axis AX1 on the lower surface of the optical waveguide 3, the optical fiber 12 exposed from the engagement part 14 is inclined at an angle θ. In the above example, the angle θ is approximately 0.2°, and is very small. It is thus possible to ignore loss due to the oblique incidence resulting from the angle θ.

Figure 10:
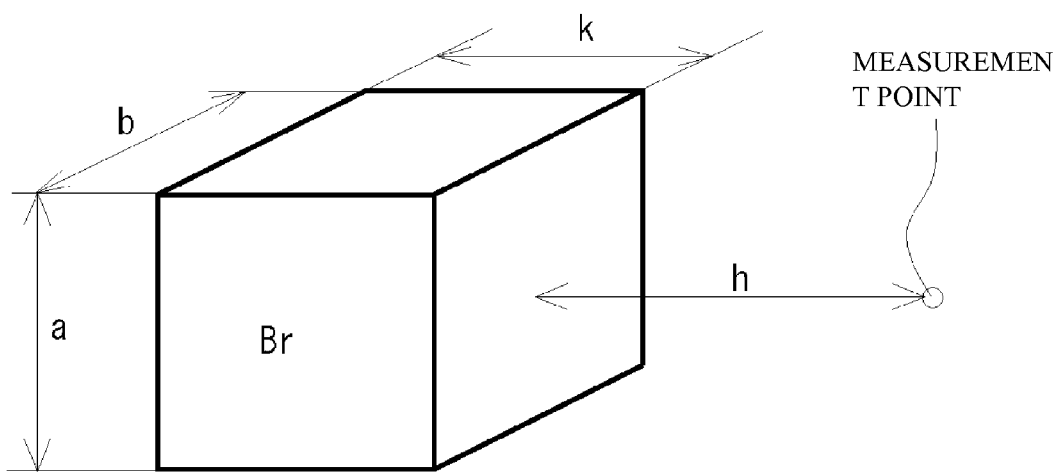
FIG. 10 is a diagram of explaining the residual magnetic flux density.
Figure 11:
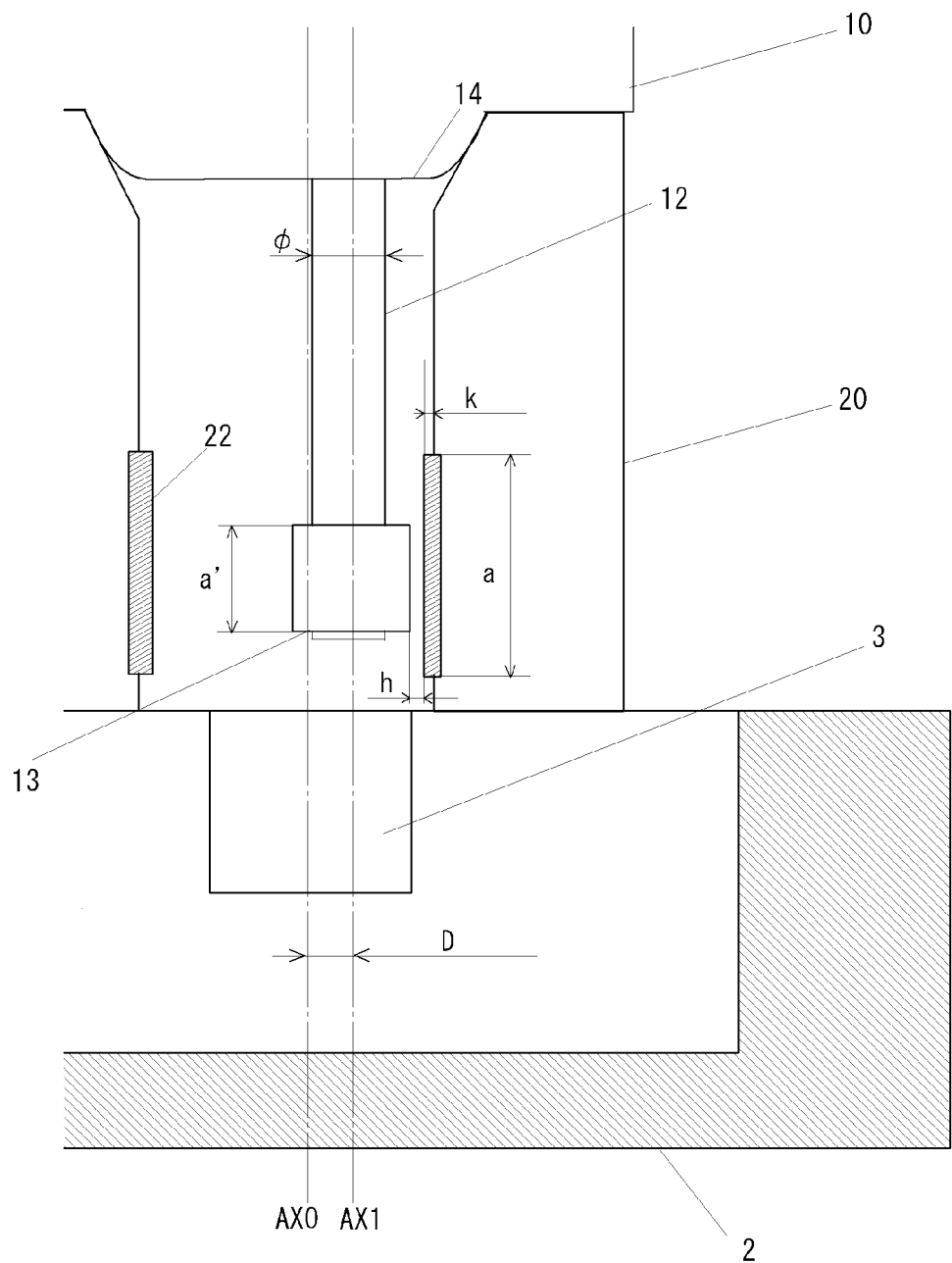
FIG. 11 is a diagram of depicting dimensions of parts of the optical waveguide substrate.

A description is now given of the magnetic force generated by the first magnetic part 13 and the second magnetic part 22 in conjunction with FIGS. 10 and 11. First, a description is given, with reference to FIG. 10, of magnetic flux density B at a measurement point that is a distance h away from a magnetic substance having residual magnetic flux density Br and dimensions of a×b×k. The magnetic flux density B at the measurement point is expressed as follows.

$$B = \frac{Br}{\pi}\left\{\text{Tan}^{-1}\left(\frac{ab}{2k\sqrt{a^2+b^2+4k^2}}\right) - \text{Tan}^{-1}\left(\frac{ab}{2(k+h)\sqrt{a^2+b^2+4(k+h)^2}}\right)\right\} \quad (2)$$

When it is assumed that the magnetic flux in the vicinity of the measurement point is uniform and absorption force is 60% taking into consideration an knowledge that the repulsive force is 50%~70% of the absorption force, the repulsive force F is represented as follows.

$$F = \frac{B^2 S}{2\mu_0} \times 0.6 \quad (3)$$

A symbol S is an area described later, and $\mu_0$ is the magnetic permeability under vacuum. The residual magnetic flux density is calculated by using the average values of neodymium magnet.

The above relationships are applied to the optical waveguide substrate 1, and the alignment adjustment by bending the optical fibers 12 is validated. It is assumed that the optical waveguide substrate 1 has the following dimensions. The diameter Φ of the optical fiber 12 in FIG. 9 is 0.125 mm. The second magnetic part 22 has dimensions such that a=b=0.55 mm (this is used for calculating the magnetic flux density B in expression (2)). The first magnetic part 13 has dimensions such that a'=b'=0.1 mm (this is used for calculating the area S in expression (3)). Thus, the area S=a'×b'=1×10$^{-8}$ m$^2$. The distance h between the first magnetic part 13 and the second magnetic part 22 is equal to 0.46 mm when the thickness k of the second magnetic part 22 is equal to 0.65 mm and the deviation distance D is equal to 0.02 mm. The residual magnetic flux density Br is equal to 1200 mT.

The repulsive force F calculated under the above conditions is approximately equal to 1.52 mgf. This value of the repulsive force F is close to that of the weight P. This means that the alignment can be adjusted by bending the optical fiber 12. Since the magnetic force depends on the distance between the first magnetic part 13 and the second magnetic part 22, the first magnetic part 13 is held in the position where the exerted magnetic forces are balanced.

As described above, the optical waveguide substrate 1 of the present embodiment is capable of performing the self-alignment of the optical axes. Since the optical axes are aligned with each other by the optical fibers 12, there is no need to manually adjust the optical axes. If the optical elements are mounted by solder bonding, the parts may be bent or warped due to heat and the alignment of the optical axes may be affected. The optical waveguide substrate 1 of the present invention does not have such a problem.

Figure 12A:
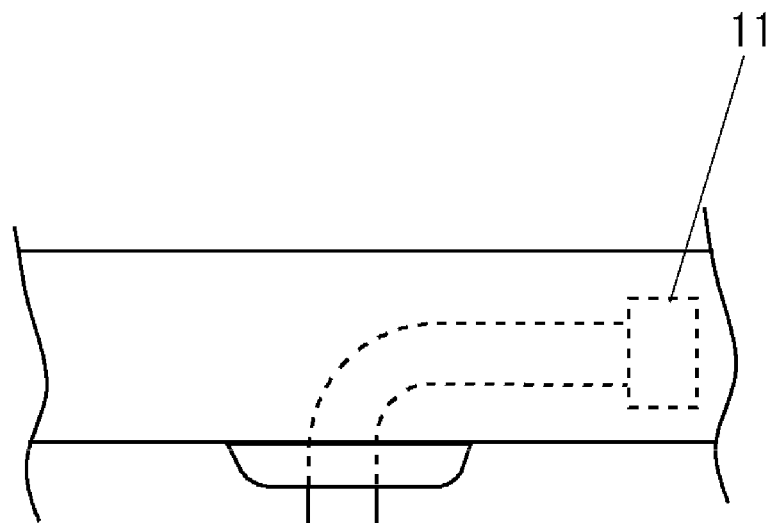
FIG. 12A is a front view of a part of an optical module equipped with an optical element included in an optical waveguide substrate in accordance with another embodiment.
Figure 12A:
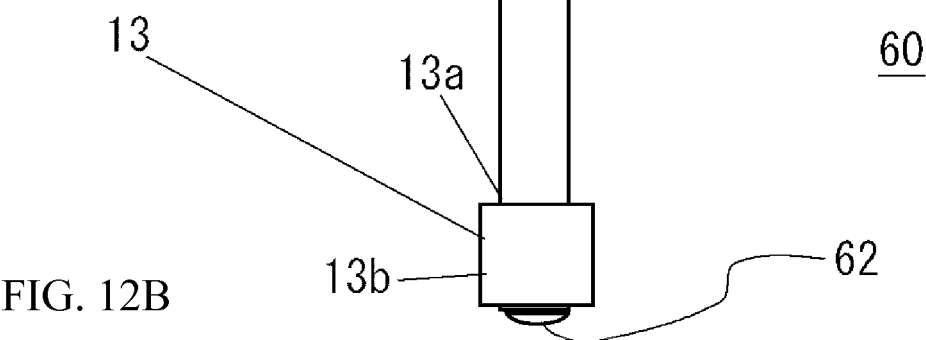
Figure 12B:
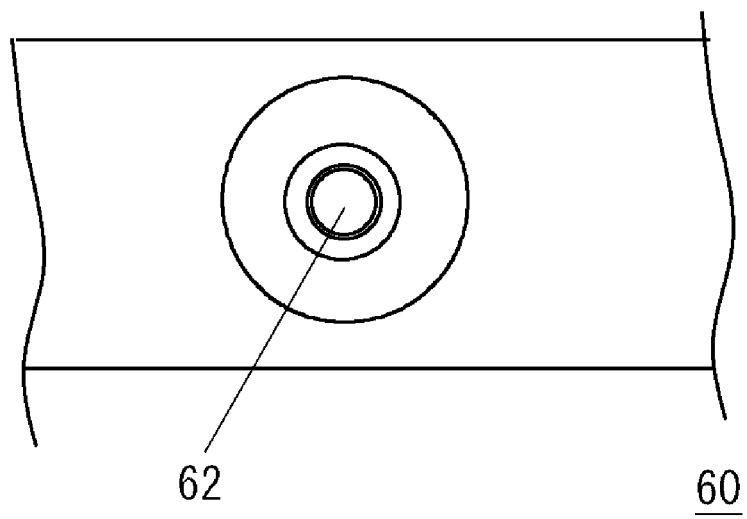
FIG. 12B is a bottom view thereof.

In the above embodiment, the optical fibers 12 are used as the signal cables. However, as illustrated in FIG. 12, a flexible cable 61 may be used as the signal cable. In this case, the optical module 60 has flexible cables 61 extending from the optical elements 11, and the first magnetic parts 13 are attached to ends of the flexible cables 61. The flexible cables 61 interiorly have metal wires for carrying electric signals, and light-receiving elements (or light-emitting elements) 62 are attached to the other ends thereof. The self-alignment of the optical axes can be performed by repulsive force that is generated between the first magnetic parts 13 and the second magnetic parts 22 and is exerted on the flexible cable 61.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various change, substitutions, and alterations could be made hereto without departing from the spirit and scope of the invention.

What is claimed is:

1. An optical waveguide substrate comprising:
   a substrate body in which an optical waveguide is formed;
   a cable holding part configured to have a cable holding hole into which a signal cable is inserted, the signal cable having one of an incidence part and an emission part that is arranged so as to face the optical waveguide and having a first magnetic part; and
   a second magnetic part configured to generate a repulsive force in the cable holding hole in association with the first magnetic part.

2. The optical waveguide substrate according to claim 1, wherein the second magnetic part is attached to an inner wall of the cable holding hole.

3. The optical waveguide substrate according to claim 1, wherein the cable holding hole has a size that allows the first magnetic part to be moved due to the repulsive force and be settled in a position where repulsive forces between the first and second magnetic parts are balanced.

4. The optical waveguide substrate according to claim 1, wherein the first magnetic part is provided around an outer circumferential part of an end of the signal cable, and the second magnetic part is provided around a circumferential wall of the cable holding hole so as to face the first magnetic part.

5. The optical waveguide substrate according to claim 1, wherein the first magnetic part has a surface having a given pole, and the second magnetic part has a surface that faces the surface of the first magnetic part and a pole identical to the given pole.

6. The optical waveguide substrate according to claim 1, wherein the optical waveguide substrate has a plurality of optical waveguides, and the cable holding part and the second magnetic part are provided for each of the plurality of optical waveguides.

7. An information processing device comprising:
   a substrate body in which an optical waveguide is formed;
   an optical element;
   a signal cable that extends from the optical element and has one of an incidence part and an emission part that faces the optical waveguide;

a first magnetic part attached to the signal cable;
a cable holding part configured to have a cable holding hole into which the signal cable is inserted; and
a second magnetic part configured to generate a repulsive force in the cable holding hole in association with the first magnetic part.

8. The information processing device according to claim 7, further comprising an optical module that is mounted on the cable holding part and includes the optical element, wherein the signal cable is suspended from the optical module and has an end to which the first magnetic part is attached.

9. The information processing device according to claim 7, wherein the optical module has an engagement part and the cable holding part has a tapered portion that engages with the engagement part.

10. The information processing device according to claim 7, wherein the information processing device includes a plurality of cable holding holes and a plurality of optical elements respectively associated with the plurality of cable holding holes.

* * * * *